United States Patent [19]

Kim

[11] Patent Number: 5,415,731

[45] Date of Patent: May 16, 1995

[54] METHOD OF PREPARING NON-GLARE GLASS

[75] Inventor: Jung H. Kim, Buchon-shi, Rep. of Korea

[73] Assignees: Jung Hyung Kim, Kyonggi-do; Hyang Wung Kim, Seoul, both of Rep. of Korea

[21] Appl. No.: 194,436

[22] Filed: Feb. 10, 1994

[30] Foreign Application Priority Data

Jul. 3, 1993 [KR] Rep. of Korea .................. 93-12472

[51] Int. Cl.$^6$ .................. B44C 1/22; C03C 15/00
[52] U.S. Cl. ...................... 216/97; 252/79.3; 252/79.4
[58] Field of Search ............ 156/654, 657, 663; 252/79.2, 79.3, 79.4; 65/31

[56] References Cited

U.S. PATENT DOCUMENTS

| | | | |
|---|---|---|---|
| 2,067,925 | 1/1937 | Clayton-Kennedy | 156/663 X |
| 2,622,016 | 12/1952 | Gilstrap et al. | 156/663 X |
| 3,616,098 | 10/1971 | Falls | 252/79.3 |
| 4,781,792 | 11/1988 | Hogan | 156/663 |
| 4,921,626 | 5/1990 | Rhodenbaugh | 252/79.4 |
| 5,281,350 | 1/1994 | Gimm et al. | 156/663 X |

*Primary Examiner*—William Powell
*Attorney, Agent, or Firm*—Millen, White, Zelano, & Branigan

[57] ABSTRACT

A method of preparing a non-glare glass comprising (a) applying a printing ink consisting of water, sugar, carboxymethyl cellulose, starch powder, and aluminum oxide on the surface of the glass by means of a conventional screen printing technique; (b) dipping the glass into a dipping solution consisting of water, sugar, ammonium bifluoride, and ferric chloride; and (c) washing the glass thus treated with water. The resulting glass has a number of fine, transparent, etched patterns on its surface, and thus, can scatter light applied to the surface in a random manner, resulting in a non-glare surface. The process produces a glass having a non-glare surface, on which various and exquisite patterns are etched, without causing environmental pollution or injury to workers.

12 Claims, No Drawings

METHOD OF PREPARING NON-GLARE GLASS

FIELD OF THE INVENTION

This invention relates to a method of preparing a non-glare glass. More particularly, this invention relates to a method of preparing glass having a non-glare surface on which a number of fine, transparent, etched patterns are formed by a chemical etching process employing both a screen printing ink and a dipping solution which do not contain any strong acids.

BACKGROUND OF THE INVENTION

Glass has been etched to form a number of etched patterns on the surface of glass, which can scatter and reflect light in a random manner, resulting in reduction of the glare on the surface of the glass.

A representative example of such etching methods is a chemical etching which comprises dipping a glass in an etching composition containing strong acids such as hydrofluoric acid, nitric acid, hydrochloric acid, and sulfuric acid.

However, the strong acids used in conventional chemical etching processes cause a number of serious problems. Namely, during the etching step, poisonous gases are generated, which are harmful to humans. Also, the waste water produced should be treated in a safe manner so as not to give rise to environmental pollution, including water pollution, air pollution, and the like. Due to these problems, chemical etching has not been practiced in advanced nations on an industrial scale, and thus, can not fulfill increasing demands for non-glare glass.

In particular, hydrofluoric acid, which has been typically used in glass etching, is now recognized as causing environmental pollution, and thus is not used in many countries. Moreover, since hydrofluoric acid is very toxic, and can be fatal to humans, special care in terms of the safety and health of the handlers of the acid must be taken. For example, when skin is exposed to hydrofluoric acid, it usually induces a sharp pain and may injure or destroy the skin tissue. In addition, hydrofluoric acid vapor may cause aphasia when it enters a worker's throat upon inhalation. Also, a pulmonary edema may result if the vapor enters the lungs. In the worst case, the vapor can damage the liver and may subsequently result in death. In order to minimize the accidents that may arise from the use of hydrofluoric acid in glass etching, extensive efforts have heretofore been exerted. As a result, a variety of auxiliary facilities have been developed to prevent environmental pollution and physical injury to workers. However, these efforts do not solve all of the above mentioned problems.

Therefore, attempts have been made to reduce or avoid the use of hydrofluoric acid as it is a fundamental cause for the problems mentioned above. A representative approach involves the use of ammonium bifluoride in place of hydrofluoric acid. For example, U.S. Pat. Nos. 2,662,016 and 3,616,098 teach an etching method employing ammonium bifluoride in combination with hydrofluoric acid. U.S. Pat. No. 4,921,626 discloses a glass etching composition comprising ammonium bifluoride, xanthum gum, water, and propylene glycol.

However, the methods and compositions taught by these prior art patents are not satisfactory to etch an article of exquisite workmanship. Moreover, it is difficult for the prior art methods and compositions to obtain a fine, embossed pattern which can scatter the light when applied to the surface of glass in a random manner.

I have conducted a wide range of studies in order to solve the above mentioned problems. As a result, I have unexpectedly discovered that a number of fine, transparent, etched patterns can be formed on the surface of glass by a process which comprises applying a printing ink onto the glass; dipping the glass into a dipping solution; and washing the glass thus treated with water.

SUMMARY OF THE INVENTION

It is therefore an object of the present invention to provide a method of preparing glass having a non-glare surface onto which a number of fine, transparent, embossed pattern are formed.

It is another object of the present invention to provide a method of preparing a non-glare glass, which does not cause the problems encountered in the prior art techniques, such as environmental pollution and physical injury to workers.

It is a further object of the present invention to provide a screen printing ink and a dipping solution which are designed to be used in the method of preparing the non-glare glass according to the invention.

Further objects of the invention will become apparent through reading the remainder of the specification.

DETAILED DESCRIPTION OF THE INVENTION

A preferred method of practicing the present invention comprises the steps of:

(a) applying a printing ink consisting of water, sugar, carboxymethyl cellulose, starch powder, and aluminum oxide on the surface of the glass by means of a conventional screen printing technique;

(b) dipping the glass into a dipping solution consisting of water, sugar, ammonium bifluoride, and ferric chloride; and (c) washing the glass thus treated with water.

The printing ink used in Step (a) above is prepared by mixing sugar and water to give an aqueous, saturated sugar solution, to which CMC, starch powder, and aluminum oxide are added. The resulting mixture is agitated to give a tacky, creamy mass. It is preferred to use 0.3 to 2% by weight of CMC, 3 to 12% by weight of starch powder, and 3 to 12% by weight of aluminum oxide on the basis of 100% by weight of a saturated solution of sugar in water, in order to impart a proper viscosity to the printing ink and a desired fidelity of pattern on the surface of the etched glass. The mixing temperature is not critical in the present invention; however, it is preferred to carry out the mixing procedure at room temperature.

The sugar in the printing ink prevents the ink from slipping down from the glass surface during the dipping procedure in Step (b). Also, sugar, together with the CMC and starch powder, exhibits the additional function of catalyzing the formation of the etched pattern on the glass surface. Water is used as an extender to adjust the concentration of the resulting ink.

Aluminum oxide powder is used to maintain the printing ink in the form of a cream, and to prevent any deterioration in the chemical properties of the ink during long-term storage. Aluminum oxide powder is highly permeable to the screen plate used for printing and exhibits a good lubricity and smoothness during the screen printing.

The dipping solution used in Step (b) above is prepared by mixing a saturated solution of sugar and water with ammonium bifluoride ($NH_4F \cdot HF$), and ferric chloride ($FeCl_3$). Particularly, a saturated sugar solution is prepared by dissolving sugar in water, and then adding ammonium bifluoride until completely dissolved. Ferric chloride is then slowly added, and the resulting mixture is agitated to completely dissolve the ferric chloride. The resulting precipitate is removed by filtration to obtain the dipping solution. It is preferred to use 50 to 100% by weight of ammonium bifluoride and 20 to 50% by weight of ferric chloride on the basis of 100% by weight of a saturated solution of sugar in water. The process temperature is not critical in the present invention; however, it is preferred to prepare the dipping solution at room temperature.

Sugar in the dipping solution serves to prevent the printed ink from slipping down from the glass surface during the dipping process in Step (b). In addition, sugar catalyzes the formation of the etched pattern. Water is used to adjust the concentration of the resulting ink.

Ammonium bifluoride is used to engrave or etch a pattern on the glass surface. The ferric chloride enhances the solubility of the ammonium bifluoride in the sugar solution and also clears the resulting opaque solution.

In Step (a), the printing ink of the invention is printed on glass by means of conventional screen printing techniques. Subsequently, in Step (b), the glass is dipped into the dipping solution of the invention for 2 to 5 minutes. The glass thus treated is then washed with water to remove the residual etching ingredients.

The process of the invention has the advantages that exquisite patterns can be etched on glass by using an aqueous printing ink containing water in place of the strong acids which cause the problems encountered in the prior art techniques. Accordingly, the process of the invention enables a glass having a non-glare surface to be produced in high yields without the corresponding environmental and health problems associated with prior art methods.

DESCRIPTION OF THE PREFERRED EMBODIMENT

The present invention will be explained in detail by way of the following example. The example is presented for illustration purposes only and should not be construed as limiting the invention which is defined in the claims.

EXAMPLE

| Preparation of Printing Ink | |
|---|---|
| Water | 1,000 cc |
| Sugar | 1,000 g |
| Carboxymethyl cellulose | 5 g |
| Starch powder | 100 g |
| Aluminum oxide powder | 100 g |

1,000 cc of water was placed in a vessel equipped with an agitator. 1,000 g of sugar was added to the vessel and then thoroughly agitated to give a solution. To the solution, 5 g of carboxymethyl cellulose was added and dissolved by agitation. To the resulting solution, 100 g of starch powder and 100 g of aluminum oxide powder were added. The resulting mixture was then agitated to obtain a creamy printing ink composition.

| Preparation of Dipping Solution | |
|---|---|
| Water | 1,000 cc |
| Sugar | 1,000 g |
| Ammonium bifluoride | 800 g |
| Ferric chloride | 400 g |

1,000 cc of water was placed in a vessel equipped with an agitator, and 1,000 g of sugar was added thereto and agitated to give a solution. To the solution, 800 g of ammonium bifluoride was added and agitated until completely dissolved. 400 g of ferric chloride was added to the solution, and the resulting was removed by filtration to obtain a dipping solution.

Etching Process

A plane of glass was subjected to a screen printing by conventional techniques using the printing ink prepared above. The glass thus treated was dipped in the above prepared dipping solution for 2 to 5 minutes. The glass thus etched was washed with water.

The glass thus treated had a number of fine, transparent, etched patterns on its surface and the glass scattered light applied to the surface in a random manner, resulting in a non-glare surface.

What is claimed is:

1. A method of etching glass with ammonium bifluoride to produce a non-glare patterned etched surface thereon which comprises the steps of:
   (a) applying to a surface of a glass to be etched a mixture of water, sugar, carboxymethyl cellulose, starch powder and aluminum oxide; and
   (b) then contacting the surface of the glass bearing the mixture with an aqueous ammonium bifluoride etching solution containing sugar and ferric chloride until the surface of the glass bearing the mixture is etched; and
   (c) thereafter removing the residual etching ingredients from the surface of the thus-etched glass.

2. The method according to claim 1, wherein said mixture contains 0.3 to 2% by weight of carboxymethyl cellulose, 3 to 12% by weight of starch powder, and 3 to 12% by weight of aluminum oxide on the basis of 100% by weight of a saturated solution of sugar in water.

3. The method according to claim 1, wherein said etching solution contains 50 to 100% by weight of ammonium bifluoride, and 20 to 50% by weight of ferric chloride on the basis of 100% by weight of a saturated solution of sugar in water.

4. A method according to claim 1, wherein in Step (a) the mixture is applied to the surface of the glass by a silk screen printing method.

5. A method according to claim 1, wherein in Step (b) the glass is dipped into the etching solution.

6. A method according to claim 1, wherein in Step (a) the mixture is viscous and is applied to the surface of the glass by a silk screen printing technique and in Step (b) the glass is dipped into the dipping solution.

7. A method according to claim 1, wherein in Step (a) the mixture is a saturated solution of sugar in water which contains 0.3 to 2% by weight of carboxymethyl cellulose, 3 to 12% by weight of starch powder, and 3 to 12% by weight aluminum oxide based on the sugar solution and is applied to the surface of the glass by silk screen printing; and in Step (b) the etching solution contains 50 to 100% by weight of ammonium bifluoride and 20 to 50% by weight of ferric chloride based on the sugar solution.

8. A method according to claim 1, wherein the residual etching ingredients are removed by washing the etched surface of the glass with water.

9. In a method of etching the surface of a glass with ammonium bifluoride, the improvement which comprises the steps of:
  (a) applying to the surface of the glass to be etched, by a silk screen printing method, a viscous aqueous mixture of sugar, carboxymethyl cellulose, starch powder and aluminum oxide;
  (b) contacting the surface of the glass bearing the mixture with an amount effective to etch the glass of an aqueous solution of ammonium bifluoride containing sugar and ferric chloride, until the surface bearing the mixture applied thereto in step (a) is etched; and
  (c) thereafter removing the residual etching ingredients from the glass by washing the etched surface of the glass with water.

10. The method according to claim 9, wherein in Step (a) the mixture is applied as a pattern and in Step (b) the glass is dipped into the aqueous solution for about 2 to 5 minutes; 0.3 to 2% by weight of carboxymethyl cellulose, 3 to 12% by weight of starch powder, and 3 to 12% by weight aluminum oxide based on the sugar solution and is applied to the surface of the glass by silk screen printing; and in Step (b) the etching solution contains 50 to 100% by weight of ammonium bifluoride and 20 to 50% by weight of ferric chloride based on the sugar solution.

11. A two-component, non-strong acid based on an etching composition comprising (a) as a first component, a viscous aqueous mixture of sugar, water, starch powder and aluminum oxide; and
  (b) as a separate second component, an aqueous ammonium bifluoride etching solution containing sugar and ferric chloride.

12. An etching composition according to claim 11, wherein the first component contains 0.3 to 2% by weight of carboxymethyl cellulose, 3 to 12% by weight of starch powder, and 3 to 12% by weight aluminum oxide based on the sugar solution and is adapted to be applied to the surface of glass by silk screen printing; and the etching solution contains 50 to 100% by weight of ammonium bifluoride and 20 to 50% by weight of ferric chloride based on the sugar solution.

* * * * *